United States Patent
Bochove

(10) Patent No.: US 10,177,526 B1
(45) Date of Patent: Jan. 8, 2019

(54) EFFICIENT WAVELENGTH COMBINING OF MULTIPLE LASER ARRAYS

(71) Applicant: The United States of America, as represented by the Secretary of the Air Force, Washington, DC (US)

(72) Inventor: Erik Johannes Bochove, Corrales, NM (US)

(73) Assignee: THE UNITED STATES OF AMERICA AS REPRESENTED BY THE SECRETARY OF THE AIR FORCE, Washington, DC (US)

(*) Notice: Subject to any disclaimer, the term of this patent is extended or adjusted under 35 U.S.C. 154(b) by 0 days.

(21) Appl. No.: 15/828,122

(22) Filed: Nov. 30, 2017

(51) Int. Cl.
| | |
|---|---|
| G02B 6/28 | (2006.01) |
| H04B 10/20 | (2006.01) |
| H01S 3/23 | (2006.01) |
| H01S 3/067 | (2006.01) |
| H01S 3/06 | (2006.01) |
| H01S 3/13 | (2006.01) |
| H01S 3/08 | (2006.01) |
| H01S 3/137 | (2006.01) |

(52) U.S. Cl.
CPC .......... *H01S 3/2308* (2013.01); *H01S 3/067* (2013.01); *H01S 3/0623* (2013.01); *H01S 3/08009* (2013.01); *H01S 3/1305* (2013.01); *H01S 3/137* (2013.01)

(58) Field of Classification Search
CPC ...... H01S 3/0623; H01S 3/1305; H01S 3/137; H01S 3/08009; H01S 3/13; H04J 14/00
USPC ............................................ 372/20; 359/334
See application file for complete search history.

(56) References Cited

U.S. PATENT DOCUMENTS

| | | | | |
|---|---|---|---|---|
| 5,524,012 A | * | 6/1996 | Wang | H01S 5/141 |
| | | | | 372/102 |
| 6,456,756 B1 | * | 9/2002 | Mead | G02B 6/425 |
| | | | | 359/334 |
| 7,199,924 B1 | | 4/2007 | Brown et al. | |
| 7,233,442 B1 | | 6/2007 | Brown et al. | |
| 7,489,447 B2 | * | 2/2009 | Zheng | G02B 3/005 |
| | | | | 359/618 |

(Continued)

OTHER PUBLICATIONS

T. Y. Fan, "Laser Beam Combining for High-Power, High-Radiance Sources", IEEE J. Sel. Topics Quant. Electron. vol. 11, 567, Oct. 10, 2005.

(Continued)

*Primary Examiner* — Tuan N Nguyen
(74) *Attorney, Agent, or Firm* — James M. Skorich

(57) ABSTRACT

Light beams from multiple emitters, such as lasers, arranged in two or more arrays are combined by beam-superposition using a dispersive element, such as a diffraction grating, to provide a combined output beam with increased power. Each emitter produces light of a controlled wavelength that is incident upon the diffraction grating at a corresponding selected incidence angle to produce a diffracted wave that propagates in an output direction and forms a component of the combined output beam. First and second arrays are located on opposing sides of the combined output beam and are arranged such that light from all of the emitters overlaps to form the combined output beam. The wavelengths may be controlled by an external resonator, for example. As many as four arrays may be combined using a two-dimensional diffraction grating.

26 Claims, 6 Drawing Sheets

(56) References Cited

U.S. PATENT DOCUMENTS

| | | |
|---|---|---|
| 7,535,631 B2 | 5/2009 | Brown et al. |
| 8,179,594 B1 | 5/2012 | Tidwell et al. |
| 8,472,763 B1 | 6/2013 | Liu et al. |
| 8,526,110 B1 | 9/2013 | Honea et al. |
| 2010/0110556 A1 | 5/2010 | Chann et al. |

OTHER PUBLICATIONS

Thomas H. Loftus, "522 W average power, spectrally beam-combined fiber laser with near-diffraction-limited beam quality", Optics Letters, 32, 349-351 (2007).

C. C. Cook and T. Y. Fan, "Spectral beam combining of Yb-doped fiber lasers in an external cavity," in OSA Trends in Optics and Photonics, vol. 26, Adv. Solid-State Lasers, M. M. Fejer, H. Injeyan, and U. Keller, Eds. Washington, DC: Optical Society of America, 1999, pp. 163-166.

V. Daneu, A. Sanchez, T.Y. Fan, H. K. Choi, G.W. Turner, and C. C. Cook, "Spectral beam combining of a broad-stripe diode laser array in an external cavity," Opt. Lett., vol. 25, pp. 405-407, Mar. 2000.

C. Hamilton, S. Tidwell, D. Meekhof, J. Seamans, N. Gitkind, and D. Lowenthal, "High power laser source with spectrally beam combined diode laser bars," Proc. SPIE, vol. 5336, 2004.

Zhanda Zhu, Long Gou, Menghua Jiang, Yongling Hui, Hong Lei, and Qiang Li, "High beam quality in two directions and high efficiency output of a diode laser array by spectral-beam-combining," Opt. Express 22, 17804-17809 (2014).

W. A. Clarkson, V. Matera, T. M. J. Kendall, D. C. Hanna, J. Nilsson, and P. W. Turner, "High-power wavelength-combined cladding-pumped Tm-doped silica fibre lasers," in OSA Trends in Optics and Photonics (TOPS), vol. 56, Conf. on Lasers and Electra-optics (CLEO 2001), Washington, DC: Optical Society of America, 2001, pp. 363-364.

M. Reich, J. Limpert, A. Liem, T. Clausnitzer, H. Zellmer, E. B. Kley, and A. Tunnermann, "Spectral beam combining of ytterbium-doped fiber lasers with a total output power of 100 W," in Europhys. Conf. Abstracts, vol. 28, 2004.

Max Born and Emil Wolf, Principles of Optics, 5th Edition, Ch.8, Pergamon Press (1975).

Peter O. Minott, James B. Abshire, "Grating Rhomb Diode Laser Power Combiner", Proc. SPIE 0756, Optical Technologies for Space Communication Systems, (Jun. 3, 1987); doi: 10.1117/12.940022; http://dx.doi.org/10.1117/12.940022.

I. H. White, "A multichannel grating cavity laser for wavelength division multiplexing applications," in Journal of Lightwave Technology, vol. 9, No. 7, pp. 893-899, Jul. 1991. doi: 10.1109/50.85791.

Antonio Sanchez-Rubio, Tso Yee Fan, Steven J. Augst, Anish K. Goyal, Kevin J. Creedon, Juliet T. Gopinath, Vincenzo Daneu, Bien Chann, and Robin Huang, Wavelength Beam Combining for Power and Brightness Scaling of Laser Systems, MIT Lincoln Laboratory Journal, vol. 20, No. 2, 2014.

B. Chann, R. K. Huang, L. J. Missaggia, C. T. Harris, Z. L. Liau, A. K. Goyal, J. P. Donnelly, T. Y. Fan, A. Sanchez-Rubio, and G. W. Turner, "Near-diffraction-limited diode laser arrays by wavelength beam combining," Opt. Lett. 30, 2104-2106 (2005).

Sandro Klingebiel, Fabian Röser, Bülend Ortaç, Jens Limpert, and Andreas Tünnermann, "Spectral beam combining of Yb-doped fiber lasers with high efficiency," J. Opt. Soc. Am. B 24, 1716-1720 (2007).

Oleksiy G. Andrusyak, "Dense Spectral Beam Combining With volume Bragg Gratings in Photo-Thermo-Refractive Glass," A dissertation submitted in partial fulfillment of the requirements for the degree of Doctor of Philosophy in the College of Optics and Photonics at the University of Central Florida Orlando, Florida, 2009.

O. Schmidt, C. Wirth, D. Nodop, J. Limped, T. Schreiber, T. Peschel, R. Eberhardt, and A. Tünnermann, "Spectral beam combination of fiber amplified ns-pulses by means of interference filters," Opt. Express 17, 22974-22982 (2009).

Derrek Drachenberg, Ivan Divliansky, Vadim Smirnov, George Venus, Leonid Glebov, "High-power spectral beam combining of fiber lasers with ultra high-spectral density by thermal tuning of volume Bragg gratings", Proc. SPIE 7914, Fiber Lasers VIII: Technology, Systems, and Applications, 79141F (Feb. 11, 2011); doi: 10.1117/12.877172.

S. A. Kemme, D. A. Scrymgeour, D. W. Peters, "High efficiency diffractive optical elements for spectral beam combining", Proc. SPIE 8381, Laser Technology for Defense and Security VIII, 83810Q (May 7, 2012); doi: 10.1117/12.919593.

Ott, Daniel & Divliansky, Ivan & Anderson, Brian & Venus, George & Glebov, Leonid. (2013). Scaling the spectral beam combining channels in a multiplexed volume Bragg grating. Optics express. vol. 21, No. 24.

Drachenberg DR, Andrusyak O, Venus G, Smirnov V, Lumeau J, Glebov LB, Ultimate efficiency of spectral beam combining by volume Bragg gratings, Appl Opt. Oct. 20, 2013;52(30):7233-42. doi: 10.1364/AO.52.007233.

* cited by examiner

EFFICIENT WAVELENGTH COMBINING OF MULTIPLE LASER ARRAYS

STATEMENT OF GOVERNMENT INTEREST

The invention described herein may be manufactured, used and licensed by or for the Government of the United States for all governmental purposes without the payment of any royalty.

FIELD OF THE INVENTION

The present disclosure relates generally to methods and apparatus for combining multiple laser beams to generate a single beam.

BACKGROUND OF THE INVENTION

There are many applications in which the generation of a high power, high brightness laser beam is desired. In addition, it is desirable that such a beam be efficient in terms of its energy utilization and thermal dissipation.

One approach uses an optically-pumped, high-gain, rare Earth-doped optical fiber as a gain medium with a built-in guiding structure. This is designed to have a single transverse mode, which provides intrinsically robust optical properties so that the output beam divergence of a single fiber is limited by diffraction. It has also a high thermal dissipation rate due to a large surface-to-volume ratio. However, the available power from a single device is currently limited to a few kilowatts by deleterious nonlinear effects, such as stimulated light scattering and thermally generated nonlinearities, which are aggravated by the long internal propagation length of the fiber.

An alternative approach is to combine the outputs of multiple fiber lasers in a single beam, either at the target or at the source. In such approaches, it is beneficial to maximize the number of combined lasers, but that can be limited by a number of factors.

BRIEF SUMMARY OF THE INVENTION

The embodiments described herein provide for increasing the number of laser outputs that may be combined to generate a single, more powerful laser beam. While the invention will be described in connection with certain embodiments, it is understood that it is not limited to these embodiments. To the contrary, the present invention includes all alternatives, modifications and equivalents within the scope of the embodiments disclosed.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings provide visual representations which will be used to more fully describe various representative embodiments. They can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION OF THE INVENTION

Figure 1:
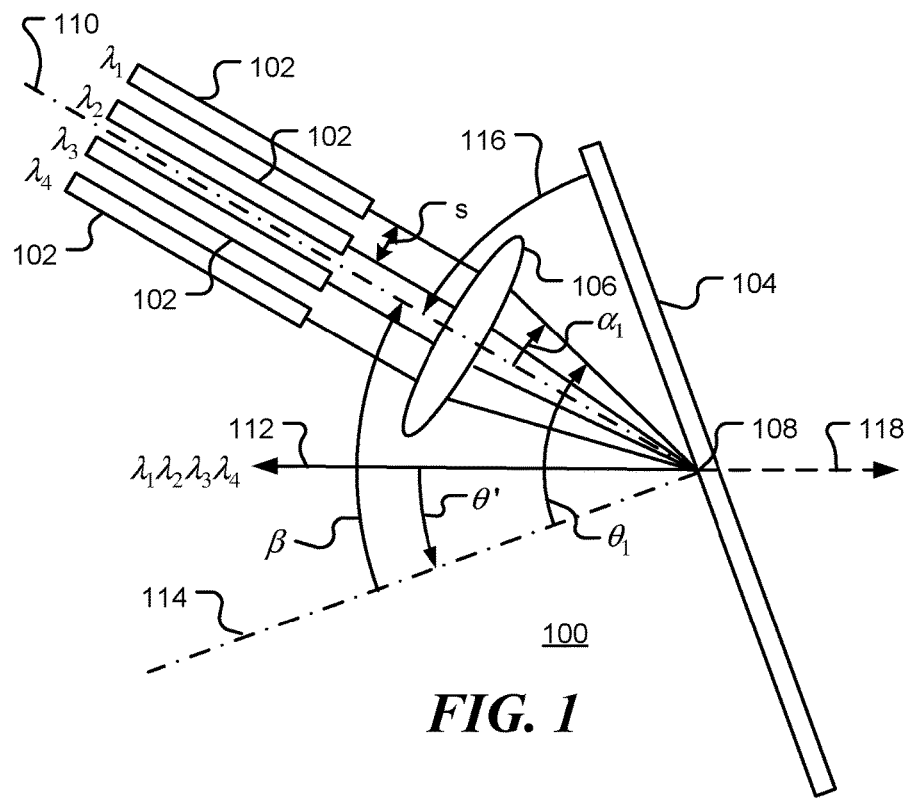
FIG. 1 is a diagrammatic representation of an apparatus for combining the output beams of a single array of lasers, operating at distinct wavelengths, using a reflective diffraction grating.

The various methods, systems, apparatus, and devices described herein generally provide for the combining of multiple laser beams to produce a laser beam having increased power.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, the term "configured" or the like may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

The present disclosure relates to techniques for generating a laser beam having an increased power. The techniques enable a laser beam to be generated by combining the outputs of multiple lasers, such as fiber lasers, into a single, more powerful beam. The limitations of prior approaches are overcome by superimposing a number of fiber lasers, each operating at different individual wavelengths, by means of a dispersive element, such as an optical grating.

It is known that a single array of N lasers of different wavelengths $\lambda_1, \lambda_2, \ldots, \lambda_N$, can be combined. However, the value of N cannot be arbitrarily large since the physical space is limited and some degree of separation is needed between the different wavelengths. The present disclosure describes methods for combining two or more arrays having the same wavelengths or different wavelengths. In one embodiment, four times as many laser beams can be combined by superposition in a single beam to provide a beam with the same beam quality as that of a single beam but with increased power.

High power lasers have application in many areas such as material processing (welding, cutting, drilling, soldering, marking, surface modification, etc.), large-scale laser displays (RGB sources), remote sensing (e.g., with LIDAR), medical applications (e.g., surgery), fundamental science (e.g., particle acceleration in particle accelerators) and laser-induced nuclear fusion.

One approach combines the lasers at the source using a phased array architecture that provides a one- or two-dimensional array of lasers with time-varying output fields that are in near-synchrony. The on-axis beam intensity at the target is then determined by the geometric size of the array and the degree that it is filled by the sub-apertures ("fill factor", expressed as a percentage). This approach is technically difficult because of the phasing requirement and, in applications where this would be important, suffers from loss of optical coherence in propagation through atmospheric turbulence.

An alternative approach overlays or superimposes the beams of a number of laser amplifiers so that all fill the same aperture. Beam superposition can be implemented either by coherent or incoherent techniques. In both approaches, the shape of the combined beam is identical to the shapes of the individual beams. Coherent beam combining (CBC), which sums beam amplitudes, is generally performed by using a number of master oscillator-injection-locked amplifiers as sources (so that their operating wavelengths are identical and output fields are coherent with respect to each other). CBC may also be performed in a tiled array configuration. In contrast, incoherent beam combining, which sums beam intensities, or powers, converts brightness by means of a device that responds to an internal degree of freedom, such as polarization or wavelength. Note, however, that in both cases, the total power in the output beam cannot exceed the sum of individual beam powers, by the law of conservation of energy. The present disclosure relates to incoherent beam combining via wavelength combining of beams, also known as spectral beam combining (SBC). SBC has the advantage over CBC of not requiring phase control (in which "optical path lengths" must be controlled typically to within a tenth of the wavelength), while wavelength control, which replaces phase control, is much easier to achieve and far less sensitive to vibrations and other sources of noise.

Therefore, in accordance with an embodiment of the present disclosure, light beams from multiple laser sources ("emitters") are combined with ultra-high energy efficiency, almost complete polarization independence, and total phase and optical path difference insensitivity. The emitters are arranged in two or more one-dimensional arrays, operating at well-controlled distinct wavelengths. The light beams are combined by beam-superposition using a dispersive element, such as a diffraction grating, to provide a combined stable output beam of power equal to that of the total power of the free-running emitters and beam quality nearly equal to that of the single emitters. Each emitter produces near diffraction-limited coherent light of distinct controlled wavelength that, by means of a lens or corresponding optics, is transformed into a collimated beam that is incident upon the diffraction grating at a corresponding selected angle, to produce a single mutually shared diffracted beam. By utilizing a one-dimensional diffraction grating, first and second emitter arrays are located on opposing sides of the combined output beam, and the emitters are arranged such that all diffracted beams overlap to form the combined output beam.

In one example embodiment, emitter wavelengths are controlled by an external resonator in a Master Oscillator Power Amplifier (MOPA) configuration. As many as four, one-dimensional, emitter arrays may be combined. The four arrays are arranged, respectively, in the four quadrants of the half-space adjoining a two dimensional diffraction grating having a rectangular groove geometry.

FIG. 1 is a diagrammatic representation of a state-of-art spectral beam combining apparatus 100 for combining the output beams of a single array of lasers, operating at distinct wavelengths, using a reflective diffraction grating. The beams are overlapped, yielding a single multi-wavelength output beam directed to the left, as indicated by solid arrow 112. For a transmission grating the output beam would be directed to the right, as indicated by broken arrow 118.

In the apparatus of FIG. 1, the lasers form a linear array of N emitters 102 (lasers or laser amplifiers, for example), which are assumed to operate at respective specified wavelengths $\lambda_1, \lambda_1, \ldots, \lambda_N$. Controlling the wavelengths may be accomplished in various ways, examples of which are discussed below. Four emitters 102 are shown in FIG. 1, but any number of emitters may be used as limited in practice by the bandwidth of the amplifiers' gain media. Adjacent emitters are separated by a distance s and placed in the left focal plane of a lens 106 of focal length f. For simplicity, the separation distance between adjacent amplifiers is treated here as being the same, but that is not a requirement. A diffraction grating 104, such as consisting of a plate with a grooved surface, is placed in the right focal plane of lens 106 so that the emitters' outputs are converted to approximate plane waves at position 108 on diffraction grating 104. In the example view shown, the lines of diffraction grating 104 are oriented perpendicular to the page. The output from the $n^{th}$ emitter makes angle $\alpha_n$ (measured with respect to the lens axis 110, as shown in FIG. 1) given by $$\tan \alpha_n = \frac{x_n}{f}, \tag{1}$$

where n=1, 2, ..., N, and $x_n$ is the distance of the $n^{th}$ emitter 102 from the lens axis 110. The diffraction grating 104 may be tilted at an angle $\theta'$ with respect to the direction of the output beam 112, so that the angles of incidence $\theta_n$ (measured with respect to the grating normal 114) are given by $$\theta_n = \theta' + \beta + \alpha_n = \theta' + \beta + \tan^{-1}\frac{x_n}{f}, \tag{2}$$

where $\beta$ is the tilt angle of the array of lasers 102. The corresponding angle of incidence 116 from the surface of the diffraction grating is $\pi/2-\beta$ radians. For a reflective grating, the incident waves are diffracted by the grating in directions $\theta_n'$ for each diffraction order $m=\pm 1, \pm 2, \ldots$, according to the grating equation $$\sin\theta_n' - \sin\theta_n = \frac{m\lambda_n}{d}, \quad (3)$$

where d is the grating period, which equals the distance between neighboring grooves and $\lambda_n$ is the operating wavelength of the $n^{th}$ laser. Equation (3) is interpreted in the following manner: For each incident beam of wavelength $\lambda_n$ and direction $\theta_n$ a diffracted beam is formed for each integer value of m, provided that the predicted values of $\sin\theta_n'$ lie in the range between and including −1 and +1. Thus, it can be shown that the number of diffracted beams produced by an incident beam of a given wavelength and incident direction is finite, and can be either an odd or even number.

In other embodiments, a dispersive element other than a diffraction grating is used. For example, a quartz prism may be used. The dispersive element has the property that light of different wavelengths is diffracted by different amounts, allowing beams that have different wavelengths and are incident at different angles to be combined into a single output beam.

Equation (3) can be rewritten as $$\frac{d}{\lambda_n}\sin\theta_n' = \frac{d}{\lambda_n}\sin\theta_n + m, \quad (4)$$

which indicates that, as traced on the surface of the diffraction grating, the output beam has m more wavelengths in a distance d than does the incident wave. Equation (3) also applies for a transmission grating.

Beam combining is accomplished by matching each incident direction $\theta_n$ with a corresponding wavelength $\lambda_n$ so that all diffracted waves emerge at the same angle, denoted $\theta'$, so that $\theta_1'\theta_2'= \ldots =\theta_N'\equiv\theta'$, as determined by repeated application of Equation (3). Since $|\sin x|\leq 1$, equation (3) shows that the product on the right-hand side must satisfy $|m|\lambda_n<2d$. This places upper limits on the order and wavelength and a lower limit on the grating period, d.

For example, in the so-called Littrow configuration, the diffracted wave retraces the incident wave, so that $\theta'=\theta\equiv\theta_L$ where $$2\sin\theta_L = \frac{m\lambda}{d}.$$

In an array, at most one amplifier can satisfy the Littrow condition exactly because of the requirement $\theta_n'=\theta_n$. However, if the Littrow condition is satisfied by any element (except approximately) the light will couple back either into the same laser, or into another Choosing the diffraction order as $m=-1$, and rearranging equation (3), gives $$\sin\theta' = \sin\theta_n - \frac{\lambda_n}{d} \quad (5)$$

Using FIG. 1, equation (5) shows that the maximum array width $W_{arr}$ is related to the operating bandwidth, $B=\max \lambda - \min \lambda$, $$W_{arr} = \frac{fB}{d} \quad (6)$$

Thus, the quantity fB/d represents the 'available array space' and the ratio f/d represents the factor by which spatial spread is related to the corresponding spectral spread.

In terms of the emitter separation distance, s, the maximum number of array elements is given by $$N = 1 + \frac{W_{arr}}{s} = 1 + \frac{fB}{ds}. \quad (7)$$

Equation (7) shows that in order to make N as large as possible it is beneficial to use a transform lens of large focal length and a short-period grating.

Assuming a grating having 1/d =1000 lines/mm, lens focal length f=1 m, E equal to a typical gain bandwidth of 50 nm (as for an Ytterbium-doped fiber amplifier), and assuming s=250 µm, this yields N≅200 elements in an array. The wavelength separation between neighboring elements is $\Delta\lambda_s=s\times(d/f)=B/N$, which equals $25\cdot 10^{-11}$ m, or 0.25 nm for this example. In practice, each laser in the array emits light within a range of wavelengths, called the spectral width, or linewidth. In order to avoid mutual coupling (cross talk) between the lasers, the wavelength separation between adjacent lases should be larger than the linewidth, so that the spectra of adjacent lasers do not overlap significantly, since that may result in a pulsation instability. The permissible overlap would likely depend on the operating power level, which could more easily become an issue in high-power arrays. This will depend on factors such the operating wavelength, pump wavelength, and type of laser (diode or fiber laser, dopant in case of rare Earth fiber laser, etc.). The wavelength separation may be by measurement, for example.

Figure 2:
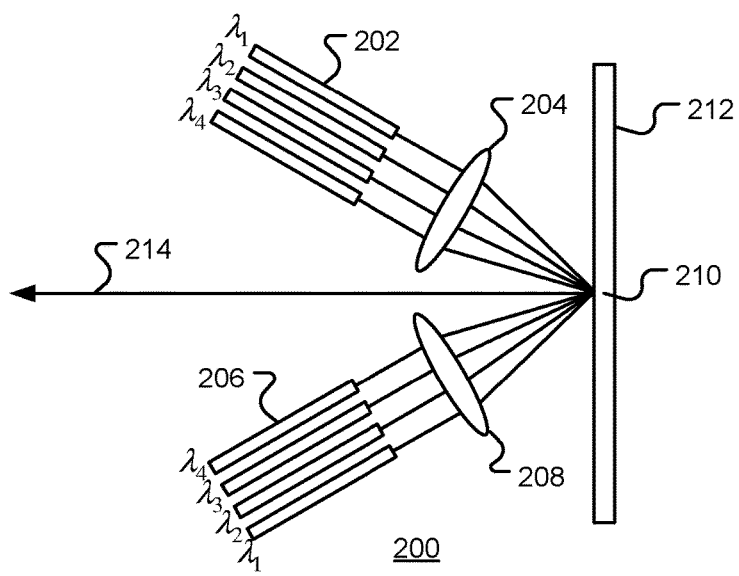
FIG. 2 is a diagram illustrating the combination of the outputs of two laser arrays for the case of a symmetric arrangement, consistent with embodiments of the disclosure.

FIG. 2 is a diagrammatic representation of an apparatus 200 for combining the outputs of two arrays, 202 and 206, in the special case of a mirror-image arrangement, consistent with embodiments of the disclosure. As described above, the arrays and the grating are located in the focal planes of the respective lenses. That is, the distance between each array and its lens is equal to the focal length of lens. Similarly, the distance from the grating to the lens is equal to the focal length of lens.

The arrangement is possible when either array is designed such that the combined beam 214 emerges in the direction that is normal to the grating 212. The parts of the system above the indicated reflection plane, and below it, are mirror images of each other that share the same output beam. The same concept can be applied to a transmission grating.

In accordance with one embodiment, the available power in the output beam 214 is doubled by combining two arrays, as shown in FIG. 2. For the sake of clarity, the case in which the output beam is in the direction that is orthogonal to the grating plane is shown. Array 202 with collimating lens 204 is designed by selecting the wavelengths of the beams such that the output beam is in the direction that is orthogonal to the grating plane. Array 206 with collimating lens 208 is constructed as a mirror image for array 202 and lens 204 with respect to a horizontal reflection plane through focal point 210 on diffraction grating 212. A simple symmetry argument shows that the array 206 will yield an output beam that overlaps with the output beam of array 202. This also follows mathematically from Eq. (3) For the upper system, the angles $\theta_n$ and wavelengths $\lambda_n$ are related by $$\sin\theta_n = \frac{\lambda_n}{d} \text{ for } m = -1 \text{ and all } \theta_n > 0, \tag{8}$$

since $\theta'=0$. The same equation holds for the lower system, where m=+1 and all $\theta_n<0$.

Figure 3:
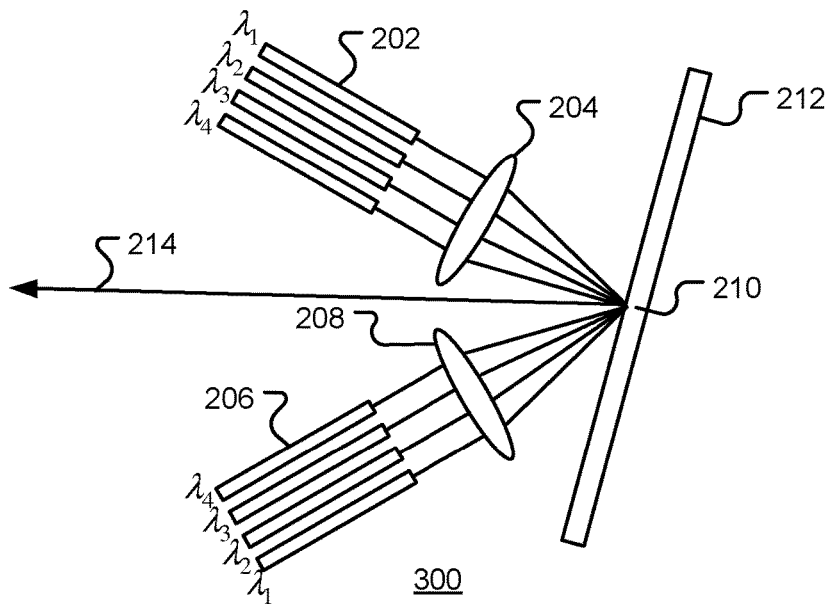
FIG. 3 is a diagram illustrating the combination of the outputs of two laser arrays consistent with embodiments of the disclosure.

FIG. 3 is a diagram of an apparatus 300 for implementing spectral combining of the output beams of two arrays, 202 and 206, consistent with embodiments of the disclosure in which two emitter arrays are positioned asymmetrically with respect to the diffraction grating 212.

In accordance with a further aspect of the disclosure, it is recognized that it is not necessary that the system be symmetric. Even if the beams of the upper array are combined into an output beam 214 that is not orthogonal to the grating 212, another array 206, emitting at the same wavelengths as array 202 can be matched to it to yield an output beam in the same direction. An asymmetric geometry may be preferable because, in the symmetric geometry, the two arrays can couple through specular reflection (i.e. ordinary reflection, which satisfies equation (3) by letting m=0). This is undesirable, as discussed above. The power levels of all lasers making up both arrays are not subject to constraint. Also, a different set of wavelengths may be used in each array. The values for the angles $\bar{\theta}_n$ associated with array 206 are selected first and then the wavelengths are calculated, dependent upon the angles.

In a general case, the angles of array 206 are denoted by $\bar{\theta}_n$ where $\bar{\theta}_n<0$. In the case of an arbitrary shared direction $\theta'$ of the output beam, the angles satisfy the relation $$\sin\bar{\theta}_n = \sin\theta' - \frac{\lambda_n}{d}, \text{ for } m = 1 \text{ and } \bar{\theta}_n < 0, \tag{9}$$

where the angles $\theta_n$ of array 202 satisfy equation (5). For efficient beam combining, the beams emerging from array 202 are configured to produce only a single diffraction beam (of order m=−1). If, for example, a diffracted beam of order m=+1 were produced by the beams of array 202, the energy of the combined output beam would be reduced by the energy of the errant beam. Similarly, the beams emerging from array 206 are arranged to produce only a single diffraction beam (of order m=1). If an order m=−1 beam were produced by the same array, the energy carried by the combined beam would be reduced similarly. In addition, the arrays are configured such that no light is scattered into any of the higher diffracted orders, given by m=±2, ±3, . . . . These conditions are met when the grating period d be smaller than all wavelengths $\lambda_n$ and is larger than each half-wavelength In addition to this required range of d as determined by the wavelengths, the beam directions must fall within certain ranges. Thus, given the limits ±1 of the sine function, the following inequalities are satisfied by the incident angle $$\left|\frac{\lambda}{d} + \sin\theta\right| > 1 \text{ and } \left|\frac{\lambda}{d} - \sin\bar{\theta}\right| > 1, \tag{10}$$

where the subscript n is omitted, since it is not needed for present purposes.

Equations (5) and (9) provide two more inequalities relating to the output angle:

$$\left|\frac{\lambda}{d} - \sin\theta'\right| < 1 \text{ and } \left|\frac{\lambda}{d} + \sin\theta'\right| < 1. \tag{11}$$

Using equations (5) and (9) with m=−1 and +1, respectively, to substitute for $\lambda/d$ in equations (10) and (11), these can be written in more convenient form in terms of parameters x,x', defined by x=−sin $\theta$ and x'=sin $\theta'$, given by $$|3x'+2x|>1, |x'+2x|>1, |2x'+x|\leq 1 \tag{12}$$

along with $|x|\leq 1$ and $|x'|\leq 1$. It is noted that, as required, these inequalities are satisfied by a wave refracted in the orthogonal direction to the grating, i.e., $$x' = 0, \frac{1}{2} < |x| < 1. \tag{13}$$

Figure 4:
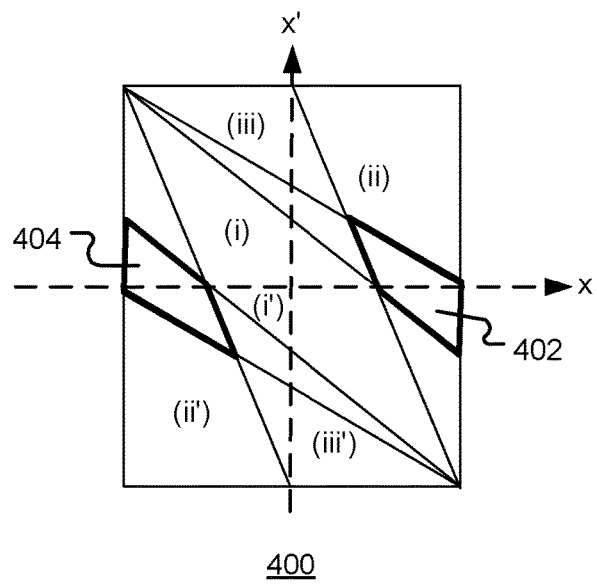
FIG. 4 is a graphical representation of regions permitted for simultaneous spectral beam combining of two arrays, consistent with embodiments of the disclosure.

FIG. 4 shows the regions permitted for simultaneous spectral beam combining of two arrays, indicated by 402 and 404. The labels of the axes are defined by x=−sin $\theta$ and x'=sin $\theta'$, where $\theta$ represents any of the angles. The totality of solutions satisfying the inequalities of equation (12), as shown in FIG. 4, are contained in two disconnected regions, 402 and 404, in the x,x' plane in which all three inequalities are satisfied. Their boundaries are emphasized by the heavy lines. Any horizontal line (i.e., x'=constant) that cuts through both regions 402 and 404 gives the extension and limits of possible arrays that combine to a single beam whose direction is defined by the value of x'. Three examples are shown, corresponding to x' having positive, zero or negative value. It is seen that the solution of equation (13) permits the largest array, where x extends from ±0.5 to ±1.

FIG. 4 illustrates that is it possible to have first and second emitter arrays located on opposing sides of a single combined output beam.

FIG. 2 and FIG. 3 show two arrangements for doubling the number of laser beams that can be superposed by a wavelength beam combining technique (i.e., spectral beam combining) in which a diffraction grating is employed. The simplest way of achieving this objective is illustrated in FIG. 2, where two identical laser arrays are symmetrically positioned with respect to the grating, so that the output beam propagates in the direction of the normal to the grating surface, passing midway between the two arrays. FIG. 3 shows a more general arrangement in which the output beam is angled with respect to the grating normal. Not all of the light emerging from either array will be diffracted by the grating, but a small portion is inevitably subject to specular reflection (i.e., ordinary reflection, satisfying the law $\theta'=\theta$). In the symmetric geometry, some of this light will couple to the partner array, which can potentially have deleterious effects, such as uncontrollable pulsation of the laser output. An advantage of the asymmetric geometry is that it avoids this specular coupling altogether. The foregoing applies equally to when a transmission grating is used.

The above applies also to the extension of the concept utilizing a grating that is ruled in two orthogonal directions (denoted by x and y axes) to combine the beams of four arrays into a single beam. Here, two grating equations are in effect, one corresponding to each ruling, which are more conveniently expressed in the terms of the direction cosines. Denoting the angles between the incident waves' propagation direction and the x axis by $\alpha_n$, the corresponding angles with respect to the y axis by $\beta_n$, and the angles $\alpha'$ and $\beta'$ to denote the direction of the combined diffracted waves, the direction cosines of the incident and diffracted ray directions are cos $\alpha_n$, cos $\beta_n$ and cos $\alpha'$, cos $\beta'$ with respect to the grating rulings. The grating equations corresponding to x and y directions are then $$\cos\alpha' - \cos\alpha = \frac{m_x \lambda}{d_x}, \cos\beta' - \cos\beta = \frac{m_y \lambda}{d_y}, \quad (14)$$

where $d_x$ and $d_y$ are the corresponding grating periods and $m_x, m_y$ are positive or negative integers denoting the respective diffraction orders. Taking $m_x, m_y = \pm 1$ yields four possible combinations, represented by the relations $$\alpha = \pm\cos^{-1}\left(\cos\alpha' + \frac{\lambda}{d_x}\right) \text{ and } \beta = \pm\cos^{-1}\left(\cos\alpha' + \frac{\lambda}{d_y}\right), \quad (15)$$

These relations determine four orientations for the incident beams. The four beams are in the directions $(\alpha, \beta)$, $(-\alpha, -\beta)$, $(\alpha, -\beta)$ and $(-\alpha, \beta)$. They overlap and combine to produce a single output beam in the direction $(\alpha', \beta')$. For a symmetric configuration, for which cos $\alpha'$=cos $\beta'$=0 and the output beam is normal to the diffraction grating, the relations are $$\alpha = \pm\cos^{-1}\frac{\lambda}{d_x} \text{ and } \beta = \pm\cos^{-1}\frac{\lambda}{d_y}.$$

An alternative configuration, the 'Littrow' configuration, offers an advantage, since it permits the ratio $\lambda/d$ to be close to 2. This is because it satisfies sin $\theta \approx$ sin $\theta' \approx \lambda/2d$. Equation (7) implies that the array size could be double that of the system disclosed above, although the Littrow system is limited to one array. However, this advantage is more than offset by the fact that, since the combined beam must pass through the array, there may not be much left of the useful array space defined above. In contrast, in the system disclosed above, there is sufficient space between the arrays to enable the combined beam to pass between them.

In addition, an alternate embodiment uses a transmission grating, which transmits all incident beams into the space behind the grating. Diffraction into different diffraction orders occurs in the same manner as when a reflection grating is employed and beam combining may be implemented using the same principles.

Important characteristics of the lasers used in spectral beam combination are (i) their operating wavelengths result in a combined output beam and (ii) the lasers are free of wavelength drift (i.e., stable). In one embodiment of the disclosure, this is accomplished by use of an external cavity or resonator.

Figure 5:
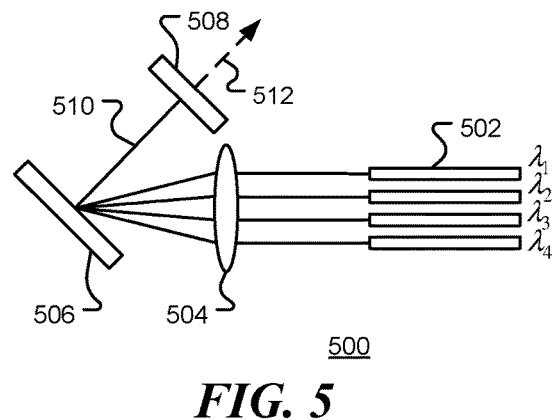
FIG. 5 illustrates spectral beam combining using feedback from an output-coupling mirror for spectral control.

FIG. 5 is a diagrammatic representation of an external cavity or resonator 500. Beams from a multi-wavelength laser amplifier array 502 are focused by lens 504 onto diffraction grating 506. Light diffracted by grating 506 is reflected from mirror 508 along path 510. The mirror 508 is only partially reflecting and performs the double function of out-coupler (OC) and feedback provider. Light 512 is transmitted as output. This configuration functions as an optical "oscillator", which operates at particular wavelengths. The wavelength selection is based on the property that only light rays that are normally incident upon the partially reflecting output mirror 508 are reflected back and retrace their paths of incidence back to the laser of origin; all others will travel out of the cavity. Thus, a ray of slightly shifted wavelength would diffract from the grating at a slightly different angle and thus not be normally incident upon the mirror. In FIG. 5, the left facet of each laser amplifier 502 is anti-reflective coated to enable light from the diffraction grating to 506 to re-enter the laser amplifier and each right facet is high reflectance (ideally 100%) coated or in contact with a 100% reflectance mirror so as to prevent light from leaking from the laser amplifier.

The use of an external cavity is one method by which the system can be controlled to lock to those wavelengths that combine into a single beam. The advantage of this method is that it is done automatically. Other methods use closed feedback loops in which wavelengths are actively measured and somehow adjusted to the right values.

However, external cavities or resonators, such as shown in FIG. 5, are prone to oscillation instabilities when operating at high power. This had led to use of a master oscillator power amplifier (MOPA) architecture. Consistent with embodiments of the disclosure, a MOPA architecture is used in combination with multiple laser arrays.

Figure 6A:
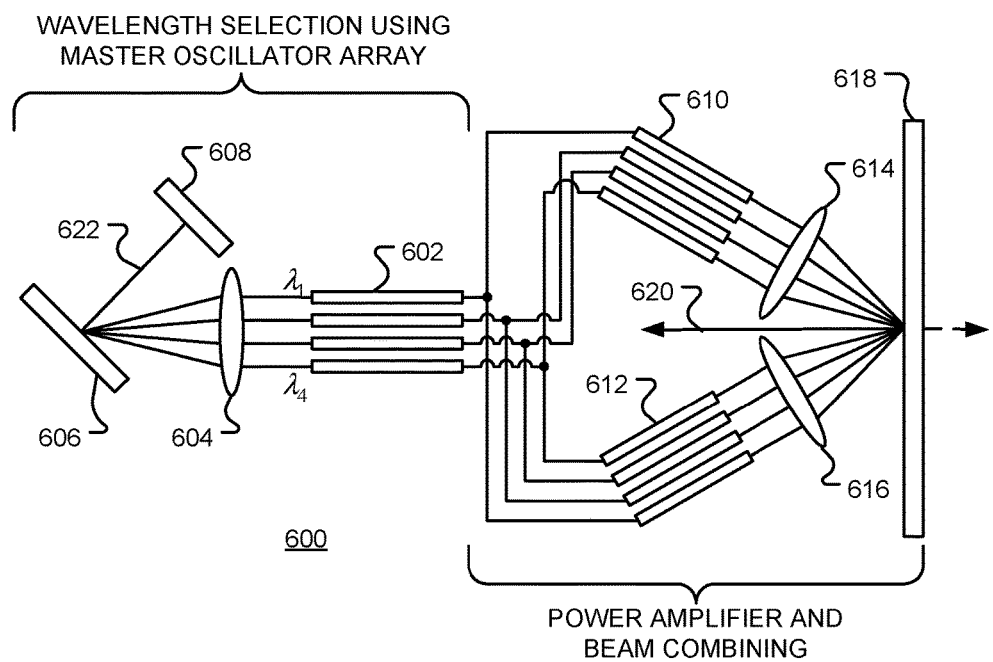
FIGS. 6A and 6B show master oscillator power amplifier (MOPA) architectures, in which low power master oscillators inject wavelength-controlled light into the power amplifier array, consistent with embodiments of the disclosure.

FIG. 6A is a diagrammatic representation of an apparatus 600 that utilizes a MOPA architecture, consistent with embodiments of the disclosure. Array 602 comprises a low power master oscillator array that injects wavelength-controlled light into the external cavity (or external resonator) formed by lens 604, diffraction grating 606 and mirror 608. The low power master oscillators 602 also drive power amplifier arrays 610 and 612. Here the operating wavelengths of the low-power master oscillator array 602, which is coupled to the 100% reflecting mirror 608 to form a cavity or resonator, are locked by the above described technique. Low-power signals from the master oscillator array are injected into the inputs of high-power amplifier arrays 610 and 612, which in turn are coupled, via lens 614 and 616, to second diffraction grating 618. In FIG. 6A, the left, or input, facet of each lower power amplifier 602 is anti-reflection coated for high transmission and each right, or output, facet is partially reflecting so that an array of cavities is formed between the partially reflecting output facets and the 100% reflecting mirror. The cavities are "tuned" to emit light at the right wavelengths for beam combination at the grating 618, where the tuning is performed by the combination of mirror 608 and grating 606 in the manner described.

Figure 6B:
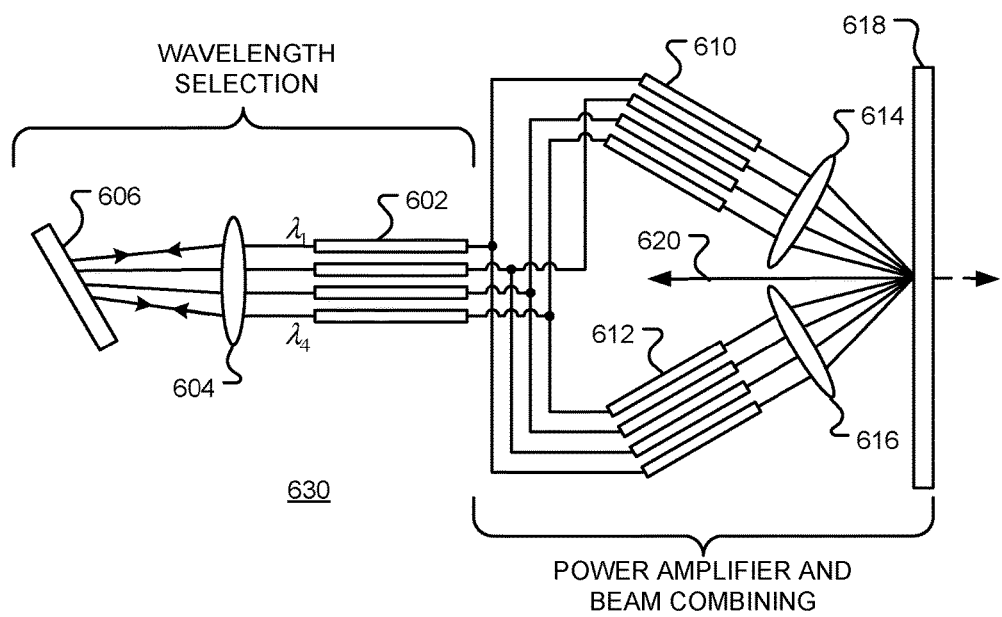

FIG. 6B is a diagrammatic representation of a further apparatus 630 that utilizes a MOPA architecture, consistent with embodiments of the disclosure. In FIG. 6B, diffraction grating 606 is used in a Littrow configuration without a mirror. In this configuration, the external cavity is formed by lens 604 and diffraction grating 606. In the Littrow configuration, light incident on diffraction grating 606 in a given direction is diffracted back along the same path. This occurs when the incidence angle $\theta_n$, wavelength $\lambda_n$ and grating period d satisfy $$\sin\theta_n = \frac{\lambda_n}{2d}.$$

In alternative implementations, quartz prisms are used in place of optical gratings as dispersive elements. Since their dispersive power is smaller, it is possible to combine a much smaller number of lasers because of the limited bandwidth of the gain medium. The grating can be either a reflection or transmission grating. In the former the combined beam travels in opposite direction to the incident beams and shares the same spatial region, while in the latter the combined and incident beams have the same direction.

A limitation of the spectral beam combining technique is that only narrow-band beams can be combined since the diffraction grating spreads the beam in different directions when it is not monochromatic.

Once a number of beams have been combined into a single beam, this beam cannot be combined again with similar beams in a series configuration. Coherent beam superposition has the advantage of permitting repeated combining, however, the significant advantage of spectral beam combining is that it does away with the phase control requirement. In a sense, phase control is substituted by the lighter requirement of wavelength control. This present disclosure provides for an apparatus for performing spectral beam combining in a parallel architecture in order to superimpose up-to four arrays of multiple spectrally separated emitters, in which each array may optimally span the same spectral range.

The principal parameters that measure device performance are the maximum number of emitters of which the output beams can be combined, the total power of the output beam and its beam quality. These also depend on the beam power and beam quality of individual emitters, as well as the gain spectrum and linewidth of their free-running output fields. Clearly, the maximum radiation intensity that the grating can withstand without significant thermal distortion is also an important parameter, which in fact may ultimately determine the system capacity. The apparatus and methodology disclosed herein increase the maximum numbers of combining elements over that of existing art.

Employment of two-dimensional rectangular-geometry gratings, which are ruled in two mutually orthogonal directions, in any of the configurations described above, enables four linear arrays to be combined simultaneously.

Figure 7A:
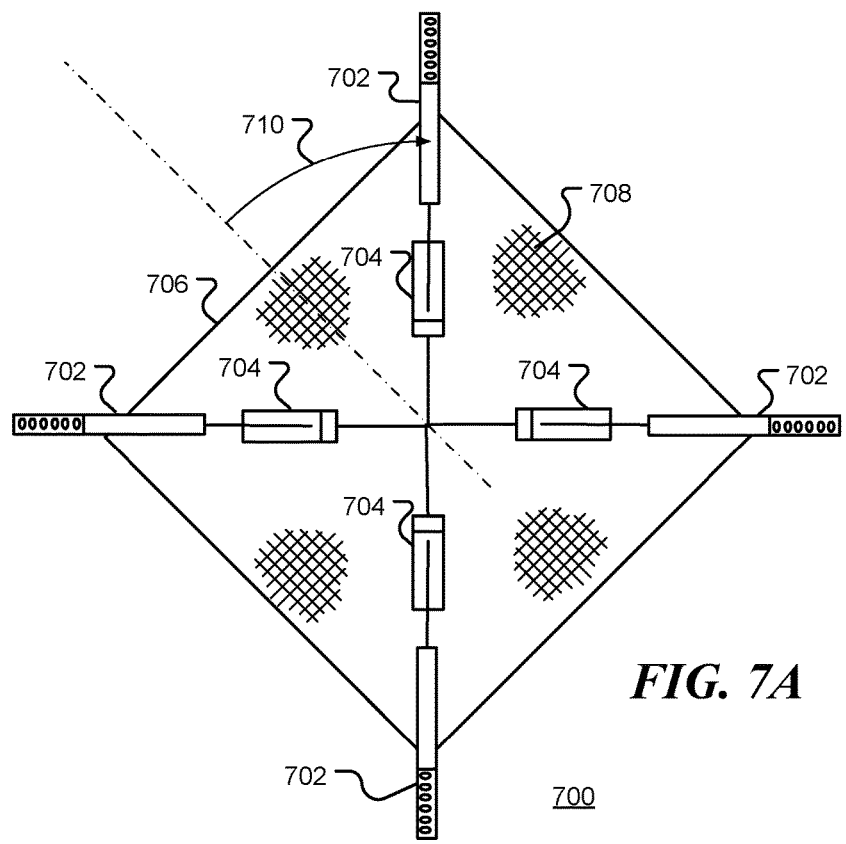
FIGS. 7A and 7B are diagrammatic views illustrating the combination of the outputs of four laser arrays positioned with respect to a two-dimensional diffraction grating, consistent with embodiments of the disclosure.
Figure 7B:
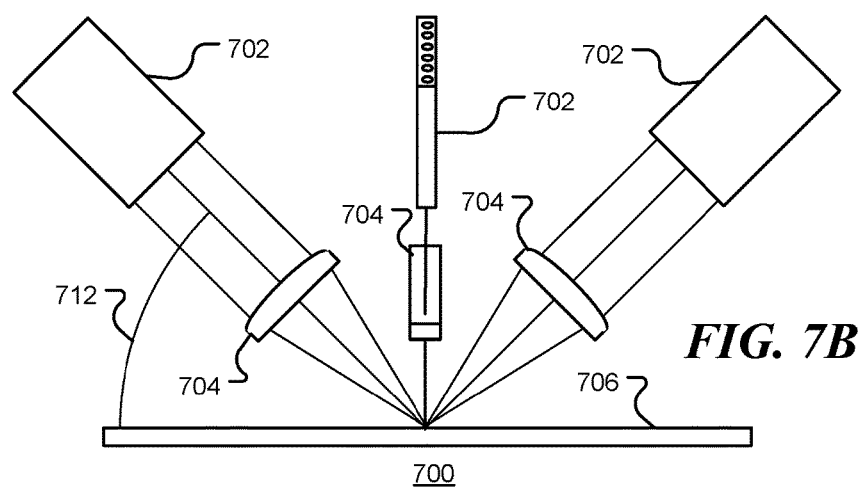

FIGS. 7A and 7B show orthogonal views of a system consistent with a further embodiment of the disclosure. This embodiment relates to spectral beam combining using a two-dimensional grating. System 700 comprises four linear arrays of emitters 702 that are focused by cylindrical lenses 704 onto two-dimensional diffraction grating 706. The lines 708 of diffraction grating 706 are arranged in a grid pattern. As viewed in FIG. 7A, the principal axes of emitters 702 are oriented at 45° to the lines, as indicated by arc 710. As discussed above, the angles between the surface of the diffraction grating and the emitters is a design choice and is associated with the wavelengths of the emitted light.

In FIG. 7A the combined beam is directed out of the page, while in FIG. 7B the combined beam is directed vertically within the page.

Figure 8:
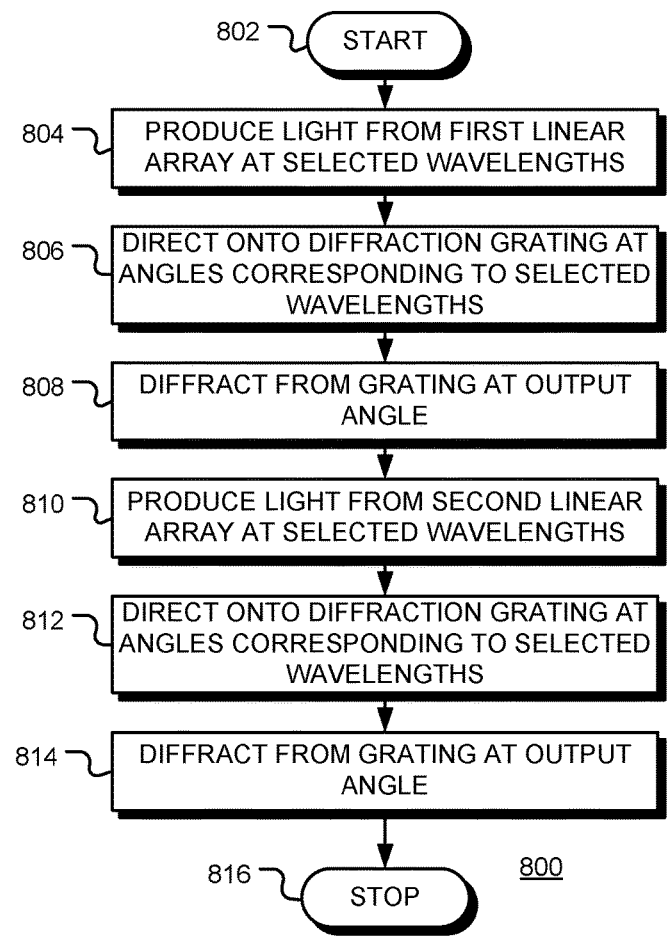
FIG. 8 is a flow chart of a method for combining light from a plurality of emitters to provide a combined output beam, in accordance with embodiments of the disclosure.

FIG. 8 is a flow chart of method 800 for combining light from a plurality of emitters to provide a combined output beam in accordance with embodiments of the disclosure. Following start block 802, light of a selected wavelength is produced from each emitter of a first plurality of low power emitters arranged in a first linear array at block 804. At block 806, the produced light is directed onto the diffraction grating. The light from each emitter is incident on the diffraction grating at an incidence angle corresponding to the selected wavelength of the emitter. The correspondence between the wavelength and the angle is discussed above. Light from each of the emitters is diffracted by the diffraction grating at block 808 and overlaps to form a component of the combined output beam. At block 810, light of a selected wavelength is produced from each emitter of a second plurality of high power emitters arranged in a second linear array. At block 812, the produced light is directed onto the diffraction grating. The light from each emitter of the second linear array is incident on the diffraction grating at an incidence angle corresponding to the selected wavelength of the emitter. Light from each of the emitters of the second linear array is diffracted by the diffraction grating at block 814 and overlaps to form a component of the combined output beam. The first and second linear arrays are located on opposing sides of the combined output beam and the first and second arrays are positioned such that diffracted light from the first and second pluralities of emitters overlap to form the combined output beam. The method terminates at block 816.

The light produced by the first plurality of emitters in a first array may be directed onto the diffraction grating by passing it through a first lens, such as cylindrical lens for example, having a first line of focus on the diffraction grating and the light produced by the second plurality of emitters onto the diffraction grating may be directed onto the diffraction grating by passing it through a second lens having a second line of focus on the diffraction grating. The first and second lines of focus are oriented parallel to the lines of the diffraction grating.

An advantage of wavelength or spectral beam combining over coherent beam combining (CBC), whether using a tiled array or a single aperture, is that spectral beam combining does not required the extremely rigorous phase and polarization control that is needed for CBC. In addition, these same factors guarantee that a spectral beam combining system is far less sensitive to environmental vibrations. However, the spectral properties of the output beams of each array should be well controlled.

For example, the spectral linewidth and jitter $\sigma_\lambda$ result in angular spreading of the output beam, given by $$\sigma_{\theta'} = \sqrt{<\cos^2\theta> w_0^2/f^2 + \sigma_\lambda^2/d^2} \quad (16)$$

where f is the focal length of the collimating lens, d is the line spacing of the grating and the first term under the square root sign is the diffractive effect of the finite core radius $w_0$. The brackets indicate averaging over the array.

In accordance with the disclosure, the source linewidth, that is the linewidth of the emitters, is controlled to be small. As discussed below, this enables more emitters to be used without light from adjacent emitters containing overlapping wavelengths. In addition, the system may be configured to minimize the effects of finite source linewidth.

The linewidth is the cause of divergence, or spreading, of the output beam, which increases the diameter on the beam when focused by a lens (or on a distant target). In other words, the "beam quality" is reduced. From equation (3) above, a small increment A in the wavelength results in a change in direction of the output beam given by $$\Delta\theta' = \frac{\Delta\lambda}{d\cos\theta'}, \quad (17)$$

where d is the grating period (separation of grooves), θ' is the direction of the combined beam measured with respect to the grating normal, and Δλ is the emitter linewidth. The angle Δθ' measures the divergence of the output beam induced by the emitter linewidth. The term cos θ' in the denominator shows that it is beneficial that the combined beam is directed close to the grating normal and in addition that the grating period d. Suppose it is required for a certain application that the angular spread of the output beam is less than $10^{-6}$ radians=1μrad (corresponding to a beam spread of 1 cm at a range of 10 km), then Equation (17) shows that the spectral width must be less than one-millionth of the grating parameter. For example, if the grating has 1000 lines per millimeter, then $d=10^{-6}$ m=1 μm and the linewidth $\Delta\lambda$ must be less than $10^{-12}$ m, or one pico-meter (pm). At a central wavelength of one micrometer this corresponds to a frequency range of 300 Megahertz (300 million cycles per second).

When feedback is provided by a partially reflecting plane mirror placed orthogonal to the output beam, a slight error $\Delta\theta'$ in the direction of the output beam will result in a displacement, $\Delta s$, of the returned beam in the array plane. The displacement is given by $\Delta s=f\, \Delta\theta'$, where f is the focal length of the transform lens. Combining this with the Equation (17), gives $$\Delta s = \frac{f\Delta\lambda}{d\cos\theta'}, \quad (18)$$

where $\Delta\lambda$ is the linewidth of the emitter. The bandwidth occupied per emitter is defined as $b=B/(N-1)$ is the spectral separation of the emitters, or Free Spectral Range (FSR), where B is the total bandwidth occupied by the array (for ytterbium-doped fiber lasers and semiconductor lasers B is approximately 40 nm (nanometers)) and N is the number of emitters. Equation (7) gives the relation $$s=bf/d, \text{ or } b=sd/f, \quad (19)$$

where s is the distance between neighboring emitters as measured between their centers. This gives the relation between the spectral width of each emitter (b) and the space (s) that it occupies. Thus, it is advantageous to use a grating with a large number of lines per millimeter (so that d is small) and a lens of large focal-length f.

In order to minimize cross-talk (coupling between neighboring emitters when feedback is present), $\Delta s$ is required to be small compared to s, i.e. $\Delta s < s$, which implies $$\frac{\Delta\lambda}{\cos\theta'} < b = \frac{d}{f}s. \quad (20)$$

Thus, the linewidth of the emitted radiation should be small compared to the FSR, which in turn is proportional to the emitter separation, s, in terms of the ratio d/f.

In the apparatus disclosed above, the combining technique is highly efficient, and beam quality achieved is similar to that of a single beam. In addition, the technique is insensitive phase and optical path variability and is sensitive to polarization only to the same degree as the grating.

Chromatic and other lens aberrations may limit array size, but these factors may be ameliorated by use of specially designed lenses (such as multiplets, aspheric and achromatic glasses, for example) and by using lens with longer focal lengths (although this would increase the size of the system). Thermal limitations may be ameliorated by using special dielectric multilayer gratings.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments.

The invention claimed is:

1. An apparatus for combining a plurality of emitters to provide a combined output beam propagating in an output direction, the apparatus comprising:
   a dispersive element;
   a first plurality of emitters arranged in a first array and configured to provide first components of the combined output beam;
   a second plurality of emitters arranged in a second array and configured to provide second components of the combined output beam;
   a third plurality of emitters arranged in a third array and configured to provide third components of the combined output beam; and
   a fourth plurality of emitters arranged in a fourth array and configured to provide fourth components of the combined output beam;
   where each emitter of the first, second, third and fourth pluralities of emitters produces light of a controlled wavelength that is incident upon the dispersive element at an incidence angle to the dispersive element, where the controlled wavelength of the light and incidence angle are related such that a diffracted wave is produced that propagates in the output direction and forms a component of the combined output beam,
   where the first array and the second array are located on opposing sides of the combined output beam, and
   where the third array and the fourth array are located on opposing sides of the combined output beam;
   where the first, and second, third and fourth components of the combined output beam overlap.

2. The apparatus of claim 1, where the first, second, third and fourth arrays are linear arrays.

3. The apparatus of claim 2, where the dispersive element comprises a diffraction grating comprising a first plurality of parallel lines having a first line spacing.

4. The apparatus of claim 3, further comprising:
   a first lens configured to focus light from the first plurality of emitters onto the diffraction grating; and
   a second lens configured to focus light from the second plurality of emitters onto the diffraction grating.

5. The apparatus of claim 3, where the first lens has a first line of focus on the diffraction grating, where the second lens has a second line of focus on the diffraction grating, and where the first and second lines of focus are parallel to the first plurality of parallel lines of the diffraction grating.

6. The apparatus of claim 3, where the first array is located in a focal plane of the first lens and the second array is located in a focal plane of the second lens.

7. The apparatus of claim 3, where a linewidth $\Delta\lambda$ of an emitter of the first array and a spacing s between adjacent emitters of the first array are configured such that $$\frac{\Delta\lambda}{\cos\theta'} \ll b,$$

where b=sd/f is the wavelength separation of adjacent emitters, the first plurality of parallel lines has a first line spacing d, the output direction is at an angle θ' to a direction normal to the diffraction grating, and the first lens has a focal length f.

8. The apparatus of claim 3, where the first and second arrays are oriented at different incidence angles to the diffraction grating such that specular reflection of light emitted from the first array of emitters is not incident upon the second array of emitters and specular reflection of light emitted from the second array of emitters is not incident upon the first array of emitters.

9. The apparatus of claim 3, where the diffraction grating comprises a transmissive diffraction grating or a reflective diffraction grating.

10. The apparatus of claim 3, where first, second, third and fourth plurality of emitters and the diffraction grating are configured such that only a single diffracted wave is produced.

11. The apparatus of claim 1, where:
the first plurality of lines is orientated in an x-direction and the second plurality of lines are orientated in a y-direction,
light from an emitter n of the first array is incident at an angle to $\alpha_n$ the x-direction and an angle $\beta_n$ to the y-direction and has wavelength $\lambda_n$,
light from an emitter n of the second array in a second quadrant is incident at an angle approximately $\pi-\alpha_n$ to the x-direction and an angle $\beta_n$ to the y-direction and has wavelength $\lambda_n$,
light from an emitter n of the third array in a third quadrant is incident at an angle approximately $\pi-\alpha_n$ to the x-direction and approximately an angle $\pi-\beta_n$ to the y-direction and has wavelength $\lambda_n$,
light from an emitter n of the fourth array is incident at an angle to the x-direction and an angle approximately to the y-direction and has wavelength $\lambda_n$,
where $$\cos\alpha_n = \cos\alpha' \pm \frac{\lambda_n}{d_x} \text{ and } \cos\beta_n = \cos\beta' \pm \frac{\lambda_n}{d_y},$$

in which $d_x$ denotes the first line spacing, $d_y$ denotes the second line spacing, and α' and β' denote the angles between the combined output beam and the x- and y-directions, respectively and where the combined beam propagates in a direction that is normal to or nearly normal to the dispersive element.

12. The apparatus of claim 1, where the first, second, third and fourth pluralities of emitters utilize a master oscillator power amplifier (MOPA) architecture for controlling the wavelengths of light from the emitters.

13. The apparatus of claim 1, where the difference between the controlled wavelengths of light from adjacent emitters is larger than the spectral linewidths of the adjacent emitters, so as to avoid cross-talk between adjacent emitters.

14. The apparatus of claim 1, where the dispersive element comprises a prism.

15. An apparatus for combining light of controlled wavelengths to provide a combined output beam propagating in an output direction, the apparatus comprising:
a first diffraction grating comprising a first plurality of parallel lines having a first line spacing;
an array of low power master oscillators;
an external resonator, comprising a lens, a second diffraction grating and a mirror, where the lens focuses light from the low power master oscillators onto the second diffraction grating to be diffracted onto the mirror that controls the wavelengths of the low power master oscillators;
a first power amplifier array that receives light from the array of low power master oscillators and produces light of the controlled wavelengths that is incident upon the first diffraction grating at first incidence angles corresponding to the controlled wavelengths;
a second power amplifier array that receives light from the array of low power master oscillators and produces light of the controlled wavelengths that is incident upon the first diffraction grating at second incidence angles corresponding to the controlled wavelengths;
a third power amplifier array that receives light from the array of low power master oscillators and produces light of the controlled wavelengths that is incident upon the first diffraction grating at third incidence angles corresponding to the controlled wavelengths; and
a fourth power amplifier array that receives light from the array of low power master oscillators and produces light of the controlled wavelengths that is incident upon the first diffraction grating at fourth incidence angles corresponding to the controlled wavelengths;
where light from the first, second, third, and fourth power amplifier arrays is diffracted from the first diffraction grating and overlaps to form the combined output beam, and where the first and second power amplifier arrays are located on opposing sides of the combined output beam, and the third and fourth power amplifier arrays are located on opposing sides of the combined output beam.

16. The apparatus of claim 15, further comprising:
a first lens configured to focus light from the first power amplifier array onto the first diffraction grating;
a second lens configured to focus light from the second power amplifier array onto the first diffraction grating;
a third lens configured to focus light from the third power amplifier array onto the first diffraction grating; and
a fourth lens configured to focus light from the fourth power amplifier array onto the first diffraction grating.

17. The apparatus of claim 16 where the first lens has a first line of focus on the first diffraction grating, where the second lens has a second line of focus on the first diffraction grating, where the third lens has a third line of focus on the first diffraction grating, where the fourth lens has a fourth line of focus on the first diffraction grating and where the first, second, third, and fourth lines of focus are parallel to the first plurality of parallel lines of the first diffraction grating.

18. The apparatus of claim 16, where the first array is located in a focal plane of the first lens, the second array is located in a focal plane of the second lens, and the third array is located in a focal plane of the third lens, and the fourth array is located in a focal plane of the fourth lens.

19. A method for combining light from a plurality of emitters to provide a combined output beam propagating in an output direction from a diffraction grating having a first plurality of parallel lines, the method comprising:
for each emitter of a first plurality of emitters arranged in a first array, of a second plurality of emitters arranged in a second array, of a third plurality of emitters arranged in a third array, and of a fourth plurality of emitters arranged in a fourth array:
producing light of a controlled wavelength;

directing the produced light onto the diffraction grating, the directed light incident on the diffraction grating at an incidence angle corresponding to the controlled wavelength; and diffracting the directed light by the diffraction grating to form a component of the combined output beam;

where the first and second arrays are located on opposing sides of the combined output beam, where the third and fourth arrays are located on opposing sides of the combined output beam, and where the first, second, third and fourth arrays are positioned such that diffracted directed light from the first, second, third and fourth pluralities of emitters overlap to form the combined output beam.

20. The method of claim 19, where directing the light produced by the first plurality of emitters onto the diffraction grating comprises passing the produced light through a first lens having a first line of focus on the diffraction grating;

where directing the light produced by the second plurality of emitters onto the diffraction grating comprises passing the produced light through a second lens having a second line of focus on the diffraction grating; and where the first and second lines of focus are parallel to the first plurality of parallel lines of the diffraction grating.

21. The method of claim 20, where a linewidth $\Delta\lambda$ of an emitter of the first array and a spacing s between adjacent emitters of the first array are configured such that $$\frac{\Delta\lambda}{\cos\theta'} \square\ b = \frac{d}{f}s,$$

where b is the wavelength separation of adjacent emitters, the first plurality of lines has a first line spacing d, the output direction is at an angle $\theta'$ to a direction normal to the diffraction grating, and the first lens has a focal length f.

22. The method of claim 19, where the first plurality of lines has a first line spacing d, and the output direction is at an angle $\theta'$ to a direction normal to the diffraction grating, and where the method further comprises:

controlling the selected angle $\theta_n$, a corresponding wavelength $\lambda_n$ of light emitted from the $n^{th}$ emitter of the first array, or a combination thereof, such that $$\sin\theta_n = \sin\theta' + \frac{\lambda_n}{d}$$

for the first array; and controlling the selected angle $\tilde{\theta}_n$, a corresponding wavelength $\tilde{\lambda}_n$ of light emitted from the $n^{th}$ emitter of the second array, or a combination thereof, such that $$\sin\tilde{\theta}_n = \sin\theta' - \frac{\tilde{\lambda}_n}{d}$$

for the second array, where the wavelengths $\lambda_n$ and $\tilde{\lambda}_n$ fall within the gain bandwidth of an amplifying medium of their respective emitters.

23. The method of claim 19, where the first plurality of emitters comprises a first power amplifier array and the second plurality of emitters comprises a second power amplifier array, the method further comprising:

generating light at the controlled wavelengths in a master oscillator array;

controlling the wavelengths of the generated light using an external optical resonator;

coupling light from the master oscillator array the first power amplifier array; and coupling light from the master oscillator array the second power amplifier array.

24. The method of claim 19, where the diffraction grating has a second plurality of parallel lines orthogonal to the first plurality of parallel lines, the method further comprising:

emitting light from the third plurality of emitters to produce a diffracted wave, diffracted by the second plurality of parallel lines of the diffraction grating, that propagates in the output direction and forms a third component of the combined output wave; and emitting light from the fourth plurality of emitters to produce a diffracted wave, diffracted by the second plurality of parallel lines of the diffraction grating, that propagates in the output direction and forms a fourth component of the combined output wave.

25. The method of claim 19, where first and second plurality of emitters and the diffraction grating are configured such that only first order diffracted waves are produced.

26. The method of claim 19, further comprising controlling the difference between the controlled wavelengths of adjacent emitters to be larger than the spectral linewidths of the adjacent emitters so as to avoid cross-talk between adjacent emitters.

* * * * *